Patented Nov. 26, 1935

2,021,911

UNITED STATES PATENT OFFICE 2,021,911

PROCESS FOR DYEING AND PRINTING TEXTILE MATERIAL

Miles Augustinus Dahlen, Wilmington, Del., assignor to E. I. du Pont de Nemours & Company, Wilmington, Del., a corporation of Delaware No Drawing. Application July 27, 1932, Serial No. 625,212

8 Claims. (Cl. 8—5)

This invention relates to processes for the dyeing and printing of textile material, more particularly it refers to processes for dyeing and printing with compositions comprising diazoimino compounds of the following general formula:

aryl—N=N—R in which aryl represents an aryl nucleus of the benzene, azobenzene, diphenyl, diphenylamine, naphthalene, carbazole or anthraquinone series containing no solubilizing group, but which may contain groups such as alkyl, alkoxy, halogen, nitro, and benzoyl-amino, and R represents a pyrrolidine or piperidine nucleus containing at least one solubilizing group; and any of the well known ice color coupling components such as the arylamides of 2-hydroxy-3-naphthoic acid, hydroxy-carbazole-, hydroxy - naphthocarbazole-, and hydroxy-anthracene-carboxylic-acids, alpha- and beta-naphthol, acetoacetyl derivatives of arylamines, and phenyl-methyl-pyrazolone.

It is an object of this invention to impart colors to textile materials in a convenient manner, commonly termed a "one-bath" process. A further object is to produce bright colors on the materials which are fast to washing, light, and chlorine. Additional objects will appear hereinafter.

These objects are accomplished by the present invention wherein the material is treated with the mixture previously referred to, comprising one of the well known ice color coupling components and a diazoimino compound, and the treated material developed by subjecting it to the action of a dilute acid at elevated temperatures.

A more complete understanding of the invention may be attained by a consideration of the following examples in which the quantities are stated in parts by weight:

Example 1

33 parts of the diazoimino compound prepared from diazotized 2-5-dichloraniline and the sodium salt of piperidine-alpha-carboxylic acid, of the following probable formula:

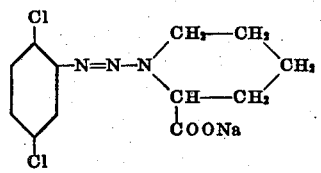

were dissolved in water. A solution of the 2-5-dimethoxy-anilide of 2-3-hydroxy-naphthoic-acid was prepared by dissolving 50 parts of the arylamide in 1000 parts of water containing 100 parts of Turkey red oil of 50% strength and 20 parts of sodium hydroxide solution of 40% strength. The two solutions were mixed and the whole mass evaporated to dryness under reduced pressure at a temperature not exceeding 50° C. A light colored powder was obtained after grinding.

A printing paste was prepared with a neutral thickener, using 15 parts of the above prepared powder in 100 parts of paste. Cotton was printed with this paste, dried, and developed by passing through a mixture of acetic and formic acids of 5–10% strength at a temperature of about 90° C. The pattern was developed as a brown dyeing. A dyestuff of the following probable formula was formed on the fiber:

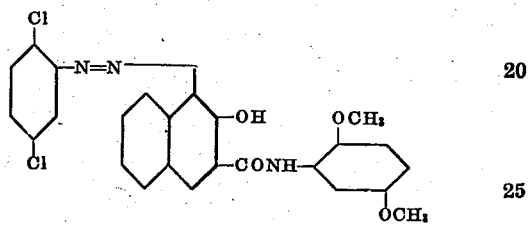

The printed material was washed with hot soap solution, then with water, and finally dried.

Example 2

31.0 parts of the diazoimino compound prepared by the action of diazotized 2-5-dichloroaniline on proline, of the following probable formula:

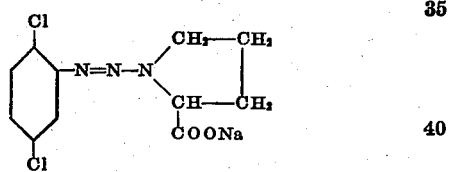

were thoroughly mixed (mechanically) with 47.1 parts of the sodium salt of the ortho-anisidide of 2-3 hydroxy-naphthoic acid.

A printing paste was prepared with a neutral thickener, using 15 parts of the above prepared powder in 100 parts of paste. Cotton piece goods were printed with the above paste; and the color developed, after drying of the print, by passing through an acetic-formic acid mixture of 5–10% strength, containing also about 5% of Glauber's salt, at a temperature of 80–90° C. The finished print was then washed with water, treated in a hot soap solution, rinsed in fresh water and dried.

The pattern was developed as a bright orange dyeing, due to the formation on the fiber of a dyestuff of the probable formula:

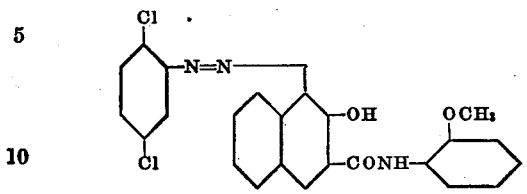

Example 3

34.6 pardts of the sodium salt of the diazoimino compound obtained by the interaction of diazotized 2-5-dichloroaniline with the sodium salt of pyrrolidine-alpha-sulfonic acid, of the following probable structure:

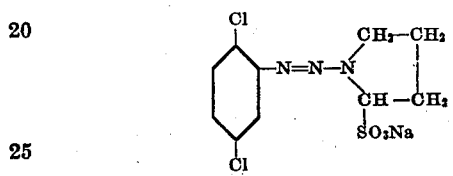

were dissolved in water. A water solution of the equivalent quantity of the sodium salt of the anilide of 2-3-hydroxynaphthoic acid was added to the solution of the diazoimino compound, and the mixture was evaporated to dryness under reduced pressure, at a temperature of about 40° C. A light colored solid material was obtained.

8 parts of the product obtained as above were disssolved in 40 parts of water, 3 parts of sodium hydroxide solution (30%), 3 parts of Turkey red oil and 46 parts of starch Tragacanth thickener were added, and the whole mass agitated to a uniform paste. Cotton piece goods were printed immediately with this paste, the printed goods were dried, and the color developed by exposing the prints to an atmosphere of steam containing acetic acid vapors. When color formation was complete, the prints were washed with water, soaped in a hot soap solution, rinsed and dried. The pattern was developed as an attractive scarlet dyeing, due to the formation of a dyestuff of the following probable constitution:

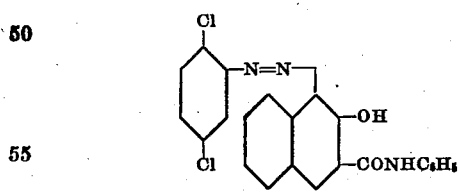

Example 4

Cotton goods were "padded" with a solution containing 12 parts of the anilide of 2-3-hydroxy-naphthoic acid, 15 parts of Turkey red oil, 18 parts of caustic soda solution of 34° Bé. and 12 parts of formaldehyde of 40% strength in 1000 parts of solution, well wrung out and then developed in a bath prepared as follows:

4 parts of the diazoimino compound obtained by the action of diazotized 3-nitro-4-amino-toluene on proline, of the following probable structure:

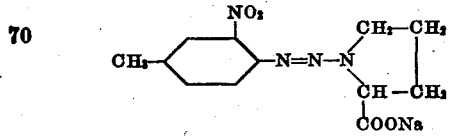

were dissolved in 1000 parts of water containing 20 parts of glacial acetic acid and 5 parts of aluminum sulfate crystals. The cotton goods were added to this solution, which was then heated slowly to 90° C., resulting in the formation of a brilliant red dyeing, due to the formation of a dyestuff of the following probable constitution:

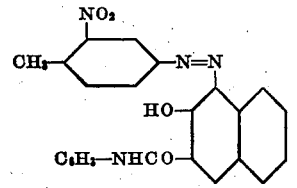

The material was rinsed, soaped and again rinsed, then dried.

As will be understood by one skilled in the art, numerous modifications of the processes indicated by the above examples may be made without departing from the spirit of this invention. Among the modifications which are possible, the following may be mentioned:

A great variety of coupling components commonly used in the "ice color" art may be utilized in the printing and dyeing compositions. Among these may be mentioned:

(a) The various arylamides of 2-3-hydroxy-naphthoic acid, such as the anilide, toluidides, halogenated anilides and toluidides, alkoxy- and halogenated-alkoxy-anilides;

(b) Acetoacetyl derivatives of arylamines, such as diacetoacet-ortho-tolidide;

(c) Alpha- and beta-naphthol;

(d) Arylamides of hydroxy-carbazole- and hydroxy-naphtho-carbazole-carboxylic acids;

(e) Phenyl-methyl-pyrazolone and similar products;

(f) Arylamides of hydroxy-anthracene- and hydroxy-phenanthrene-carboxylic acid;

(g) Arylamides of 3-hydroxy-diphenylamine-4-carboxylic acid.

Various acids may be used instead of acetic and formic acids for the development of the color on the fiber.

The temperature at which color development is effected is subject to certain variations in accordance with the constitution of the printing or dyeing compositions.

The formulation of the printing pastes may be varied as to gum and starch content, and alkali content, as is well known in the art.

The aromatic amino component of the diazoimino compound should not have any solubilizing groups substituted thereon but may have other groups such as alkyl, alkoxyl, halogen, nitro, and benzoyl-amino as substituents. The piperidine or pyrrolidine derivative of the diazoimino compound should have at least one solubilizing group substituted thereon, preferably a carboxylic acid or sulfonic acid group. However, in certain cases, it may be desirable to increase the solubility of the compound by having more than one solubilizing group substituted on the pyrrolidine or piperidine nucleus, as is mentioned in my copending applications, Serial Nos. 625,210 and 625,211, filed July 27, 1932.

Solubilized pyrrolidine compounds referred to in the aforementioned application Serial No. 625,211 are:

Pyrrolidine-beta-carboxylic acid,
Pyrrolidine-dicarboxlic acids and polycarboxylic acids,
Ring alkylated pyrrolidine-carboxylic- and sulfonic acids, such as 4,5-dimethyl-pyrrolidine-2-carboxylic acid, Pyrrolidine-di- and poly-sulfonic acids,
Polyhydroxy-pyrrolidine-carboxylic- and sulfonic acids.

When reference is made to a mixture of an ice color coupling component and a diazoimino compound it is to be understood that this mixture may include various assistants such as starch, alkali, Turkey red oil, and gums. The composition of these assistants is well known to one skilled in the art and no difficulty should be had in selecting the proper assistant for any given dyeing or printing composition.

The dye is developed on the material by treatment with a dilute acid at elevated temperatures. As previously mentioned, various acids other than acetic and formic acids may be used, and these acids may be either in liquid or vapor phase. This treatment results in hydrolysis of the diazoimino compound and the subsequent coupling of the diazo salt with the ice color coupling component.

The process of the present invention enables textile material to be colored in a single step. This is a tremendous advantage over the older processes where multiple steps were necessary or where nitrosoamines prepared from diazotized bases were used with the consequent well known difficulties. The dyeings and printings obtained are generally fast to washing, light and chlorine and are comparable with the results previously obtained by the tedious two step process of "padding" the fiber with the coupling component and dyeing or printing with a diazo salt.

As many apparently widely different embodiments of this invention may be made without departing from the spirit and scope thereof, it is to be understood that I do not limit myself to the specific embodiments thereof except as defined in the appended claims.

I claim:

1. A composition of matter which comprises an ice color coupling component and a diazoimino compound having the following general formula:

aryl—N=N—R wherein aryl represents the residue of a diazotized aromatic amine which is free from carboxylic and sulfonic acid groups, and R represents the residue of a pyrrolidine compound containing a water-solubilizing group in the beta-position.

2. A composition of matter which comprises an ice color coupling component and a diazoimino compound having the following general formula:

aryl—N=N—R wherein aryl represents the residue of a diazotized aromatic amine of the benzene series which is free from carboxylic and sulfonic acid groups, and R represents the residue of a pyrrolidine compound containing a plurality of water-solubilizing groups, one of which is in the beta-position.

3. A composition of matter which comprises an arylamide of 2-hydroxy-3-naphthoic acid and a diazoimino compound having the following general formula:

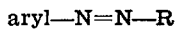
aryl—N=N—R wherein aryl represents the residue of a diazotized aromatic amine of the benzene series which is free from carboxylic and sulfonic acid groups, and R represents the residue of a pyrrolidine-beta-carboxylic acid.

4. A composition of matter which comprises an arylamide of 2-hydroxy-3-naphthoic acid and a diazoimino compound having the following general formula:

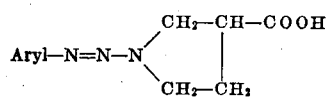

wherein aryl represents the residue of a diazotized aromatic amine of the benzene series which is free from carboxylic and sulfonic acid groups.

5. A process for coloring material which comprises treating said material with a mixture comprising an ice color coupling component and a diazoimino compound having the following general formula:

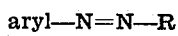
aryl—N=N—R wherein aryl represents the residue of a diazotized aromatic amine which is free from carboxylic and sulfonic acid groups, and R represents the residue of a pyrrolidine compound containing a water-solubilizing group in the beta-position, then developing the color by subjecting the treated material to the action of a dilute acid at elevated temperatures.

6. A process for coloring material which comprises treating said material with a mixture comprising an ice color coupling component and a diazoimino compound having the following general formula:

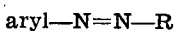
aryl—N=N—R wherein aryl represents the residue of a diazotized aromatic amine of the benzene series which is free from carboxylic and sulfonic acid groups, and R represents the residue of a pyrrolidine compound containing a plurality of water-solubilizing groups, one of which is in the beta-posion, then developing the color by subjecting the treated material to the action of a dilute acid at elevated temperatures.

7. A process for coloring textile material which comprises treating said material with a mixture comprising an arylamide of 2-hydroxy-3-naphthoic acid and a diazoimino compound having the following general formula:

aryl—N=N—R wherein aryl represents the residue of a diazotized aromatic amine of the benzene series which is free from carboxylic and sulfonic acid groups, and R represents the residue of a pyrrolidine-beta-carboxylic acid, then developing the color by subjecting the treated material to the action of dilute acetic acid at elevated temperatures.

8. A process for coloring textile material which comprises treating said material with a mixture comprising an arylamide of 2-hydroxy-3-naphthoic acid and a diazoimino compound having the following general formula:

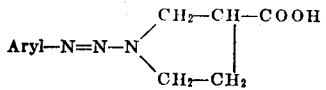

wherein aryl represents the residue of a diazotized aromatic amine of the benzene series which is free from carboxylic and sulfonic acid groups, then developing the color by subjecting the treated material to the action of dilute acetic acid at elevated temperatures.

MILES AUGUSTINUS DAHLEN.